US009594841B2

(12) United States Patent
Driediger (10) Patent No.: US 9,594,841 B2
(45) Date of Patent: Mar. 14, 2017

(54) METHODS AND SOFTWARE FOR WEB DOCUMENT SPECIFIC MESSAGING

(71) Applicant: Jordan Ryan Driediger, Caledon East (CA)

(72) Inventor: Jordan Ryan Driediger, Caledon East (CA)

( * ) Notice: Subject to any disclaimer, the term of this patent is extended or adjusted under 35 U.S.C. 154(b) by 208 days.

(21) Appl. No.: 14/507,926

(22) Filed: Oct. 7, 2014

(65) Prior Publication Data

US 2016/0099982 A1    Apr. 7, 2016

(51) Int. Cl.
*G06F 15/16* (2006.01)
*G06F 17/30* (2006.01)
*G06Q 50/00* (2012.01)

(52) U.S. Cl.
CPC ....... *G06F 17/30867* (2013.01); *G06Q 50/01* (2013.01)

(58) Field of Classification Search
CPC . H04L 63/08; H04L 63/126; H04L 29/12066; G06F 17/30864; G06F 19/322
See application file for complete search history.

(56) References Cited

U.S. PATENT DOCUMENTS

| | | |
|---|---|---|
| 7,000,019 B2 | 2/2006 | Low |
| 8,516,031 B2 | 8/2013 | Eschenauer et al. |
| 8,566,404 B2 | 10/2013 | Wu et al. |
| 8,583,471 B1 | 11/2013 | Voskuhl et al. |
| 8,589,807 B2 | 11/2013 | Baldwin et al. |
| 8,635,519 B2 | 1/2014 | Everingham et al. |
| 2005/0160059 A1* | 7/2005 | Garrity .................. G06Q 10/00 |
| 2005/0203931 A1* | 9/2005 | Pingree ............. G06F 17/30997 |
| 2009/0222278 A1 | 9/2009 | Reinders et al. |
| 2012/0036423 A1* | 2/2012 | Haynes, II ............ G06F 17/241 715/230 |
| 2012/0089681 A1 | 4/2012 | Chowdhury et al. |
| 2012/0174224 A1* | 7/2012 | Thomas ................ G06F 21/566 726/24 |
| 2012/0266081 A1 | 10/2012 | Kao |
| 2013/0014258 A1 | 1/2013 | Williams |
| 2013/0031470 A1 | 1/2013 | Daly, Jr. et al. |

(Continued)

FOREIGN PATENT DOCUMENTS

| | | |
|---|---|---|
| CA | 2489028 A1 | 12/2003 |
| CA | 2829103 A1 | 9/2012 |

(Continued)

*Primary Examiner* — Peling Shaw
(74) *Attorney, Agent, or Firm* — Malloy & Malloy, P.L.

(57) ABSTRACT

The present invention is directed to methods and software for web document specific messaging. The methods and software may comprise first determining the digital identifier of a current web document from an application on a user device. The digital identifier is then received at the application server comprising a database. The database is queried for any viewable content associated with the digital identifiers. The viewable content may further be filtered based on user selected filters. The resulting filtered content is then displayed to the user. The user may further be able to input user content relating to the current web document and other user content, which may be viewable by other users depending on user selected privacy settings, this user content may be submitted and associated to the same digital identifier to be shared with other users.

6 Claims, 9 Drawing Sheets

(56) References Cited

U.S. PATENT DOCUMENTS

| | | |
|---|---|---|
| 2014/0032273 A1 | 1/2014 | D'Angelo et al. |
| 2014/0052656 A1 | 2/2014 | Hall |
| 2014/0101250 A1 | 4/2014 | Dunn et al. |
| 2016/0026346 A1* | 1/2016 | Wakeen ............... G06Q 10/107 715/753 |

FOREIGN PATENT DOCUMENTS

| | | |
|---|---|---|
| EP | 2439692 A1 | 4/2012 |
| WO | WO2012028957 A2 | 3/2012 |
| WO | WO2012058690 A2 | 5/2012 |
| WO | WO2013188815 A2 | 12/2013 |

* cited by examiner

METHODS AND SOFTWARE FOR WEB DOCUMENT SPECIFIC MESSAGING

BACKGROUND OF THE INVENTION

Field of the Invention

The present invention generally relates to methods and software for web document specific messaging. Specifically, the present invention utilizes a combination of front end software, such as in the form of a browser, browser extension, or mobile application, with backend processing on at least one server and corresponding database, in order to provide for a web document specific message board and/or interactive chat application for users viewing a particular web document.

Description of the Related Art

An Internet forum or message board is an online discussion site that allows people to hold conversations in the form of posted messages. Modern message boards can be traced back to the earlier dial-up based bulletin board systems (BBS), which allowed users to connect and log onto a system using a terminal program, in order to upload and download data, share information, and exchange messages with other users, whether by way of a public message board, private messaging, or direct live chatting.

Today, modern message boards have evolved along with the web, and host a vast array of different user-generated content and discussion related to different topics. Forum software packages have become widely available on the Internet and are written in a variety of programming languages, such as PHP, Perl, Java, and ASP. The configuration and records of user posts are typically stored in text files or in databases. Each software package may offer different features, such as social networking features or integration, personal galleries, comment systems, as well as integrated chat systems. Modern message boards may also accommodate various media content in addition to text, to include images, sounds, and videos which may be readily embedded into a message for easy viewing.

However, despite the evolution and feature richness of modern message boards, a problem persists that has been compounded by the massive increase of information found on the Internet today. Throughout the web, disparate and discrete web pages, blog articles, social media feeds, and other web documents comprise irrelevant, spam-filled, and scattered content. Cluttered or barren webpage comment sections can be found all across the Internet, and various forums and review sites having pertinent information may be difficult to locate and/or to navigate to. Even when found, individuals who have posted content are generally strangers who are unfamiliar to the reader, and thus not always trustworthy.

Thus, there exists a need to organize user-generated content in a coherent manner on a single unified platform, such that a user may filter relevant user-generated content from one or more sources that corresponds directly to a web document or web page that they are presently viewing.

SUMMARY OF THE INVENTION

The present invention contemplates a web document specific messaging method and software. Specifically, a unified platform is provided whereby users viewing the same web document may communicate with each other.

In initially broad terms, a preferred method of the present invention may be implemented on a system comprising at least a user device communicably connected to an application server and a web server over a network. The user device comprises an application with a user interface for facilitating the operations described below.

Accordingly, a user may first navigate to a web document hosted on a web server. The digital identifier(s) of the web document is then identified, from an application on the user device. Specifically, the digital identifier(s) may comprise the URL, URI, DOI, content, or metadata of a web document. In some embodiments, a plurality of digital identifiers may be identified for a web document, and a priority digital identifier may be determined. In other embodiments, a plurality of digital identifiers may be used concurrently for the operations discussed below.

The digital identifier(s) is received at the application server comprising a database. The database on the application server is then queried, for any viewable content associated with the digital identifier(s). The viewable content may be further filtered, based on user selected filters from the application. The filtered content is then displayed to the user.

The user may additionally input user content relating to the current web document on the user device and application. The user may additionally select a privacy setting for the user content. The user content and privacy setting are received at the application server. Finally, the user content and privacy setting are associated with the digital identifier(s) in the database, and shared with other users of the application server in accordance with this process.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As illustrated by the accompanying drawings, the present invention is directed to a method and computer program for web document specific messaging. Specifically, the present invention provides for a unified platform for facilitating the communication between users viewing a certain web document based on a determinable digital identifier. The present invention is particularly advantageous because it presents only content relevant to a web document the user is presently viewing, and may further filter the content based on user specified filters.

Figure 1:
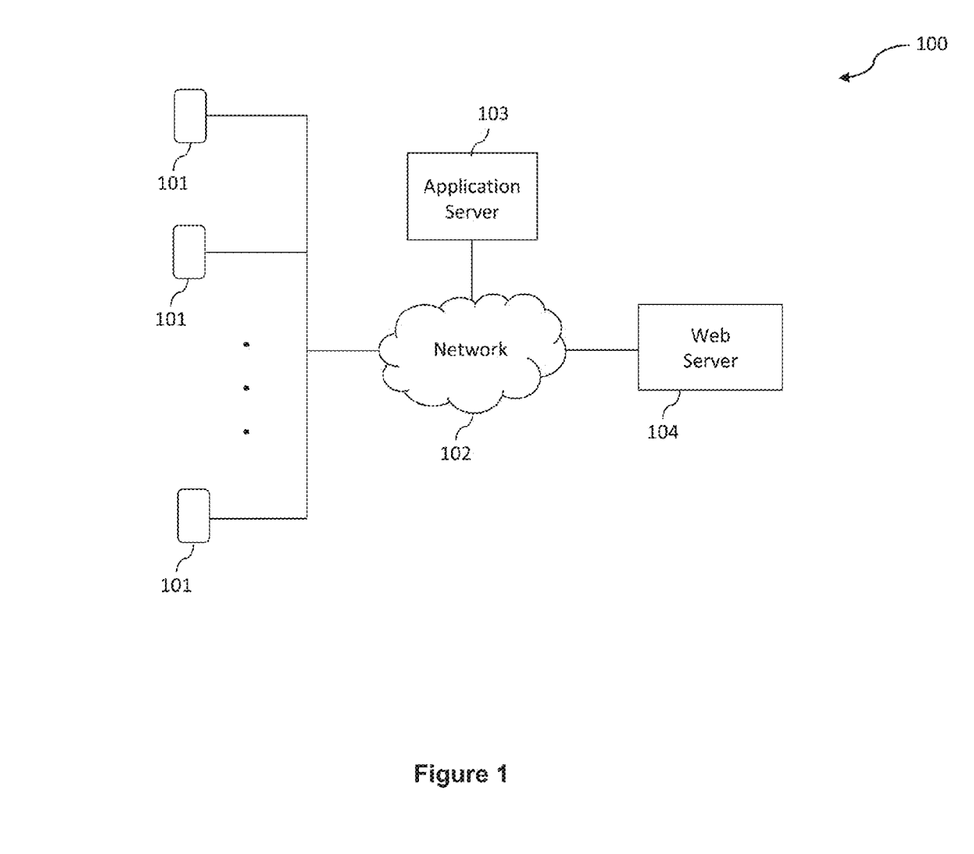
FIG. 1 illustrates a general schematic of a system comprising basic hardware components required to perform a method for web document specific messaging.

The present invention may be implemented as part of a networked system 100 generally represented in FIG. 1. Accordingly, a system 100 of the present invention generally comprises at least one device 101 communicably connected to an application server 103 over a network 102. A web server 104 may further be communicably connected to the application server 103 and at least one device 101 over the same network 102.

The device 101 may comprise a mobile device, a tablet, a computer, a wearable electronic device, or any other device or combination of circuits structured and configured to communicate with another device, computer, or server over the network 102. The device 101 may comprise application(s) and user interface(s) that allows a user to interact with the application server 103 and web server 104. The user interface may be proprietary or may comprise a web browser, mobile browser, or other application or executable code that allows for communication and visualization of information.

The application server 103 and web server 104 may comprise general purpose computers, specialized computers, or other hardware components structured and configured to receive, process, transmit, and store information to and from other devices. The application server 103 is further configured with executable or interpretable computer code that allows it to perform the processes described within this application. The application server 103 may implement the methodology of the present invention using any number of solution stacks known to a programmer skilled in the art. These solution stacks may include, without limitation, ZEND Server, APACHE Server, NODE.JS, ASP, PHP, Ruby, XAMPP, LAMP, WAMP, MAMP, WISA, and others known to those skilled in the art. The web server 104 may comprise any hardware configured to host and transmit web or electronic documents.

The network 102 may comprise at least two computers in communication with each other, which may form a data network such as via LAN, WAN, Serial, Z-WAVE, ZIGBEE, RS-485, MODBUS, BACNET, the Internet. The connections may be facilitated over various wired and/or wireless mediums or any combination thereof including interconnections by routers and/or gateways. The network 102 may comprise additional hardware components and/or devices appropriate for facilitating the transmission and communication between the various systems and devices of the present invention, such as those directed to integrated authentication, quality control or to improve content delivery.

Figure 2:
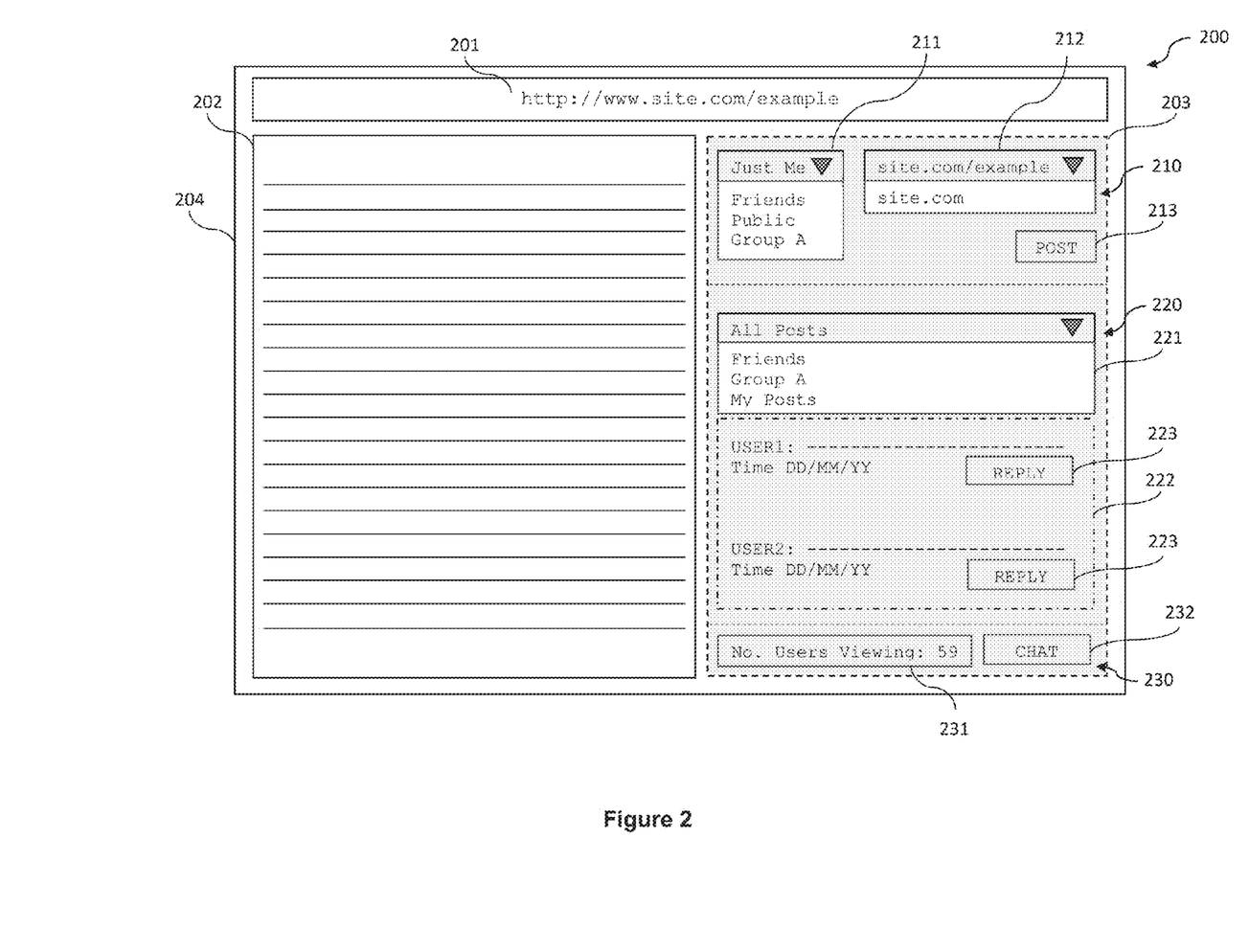
FIG. 2 illustrates a wireframe directed to a user interface of an application for performing a method for web document specific messaging.

FIG. 2 illustrates an exemplary wireframe of a user interface 200 for executing the steps of the present invention, and provides an example of how a user might interact with the system 100 of the present invention, in order to perform the programmed steps thereon, which will be described in further detail below. Accordingly, a user interface 200 may comprise a web browser, a browser in combination with a browser add on or extension, a mobile browser, or other appropriate software application(s) for viewing content online via various known protocols, such as but not limited to the hypertext transfer protocol (HTTP). Web and mobile browsers may include, but are not limited to, Mozilla Firefox, Google Chrome, Apple Safari, Microsoft Internet Explorer, Opera, and other applications for accessing and viewing HTML, XHTML, PHP or other text or media content such as images, audio, and videos, through a URL.

In a web or mobile browser based embodiment, a user interface 200 may comprise an address bar or uniform resource locator (URL) bar 201, a content area 202 for displaying the text and/or media content of a particular URL, as well as a message area 203. The message area 203 may be displayed as part of an add on or browser extension of the browser window 204, and is configured to be interoperable with the browser, such as through an application programmable interface (API) of the browser. The layout shown is only exemplary in nature, as the message area 203 relative to the content area 202 may comprise various different configurations. For instance, the message area 203 may be scalable to take up a portion of the visible browser window as illustrated, or may comprise a partially transparent overlay in partially or wholly overlying relations relative to the content section 202. Further, the message area 203 may comprise a posting area 210, a viewing section 220, and a chat section 230.

The posting section 210 allows a user to post user-generated content in the form of text, images, audio, and/or video, via the post button 213. Standard text box or window input may be used, not shown, such as a WYSIWYG editor. The user, in addition to inputting content, may select the privacy setting 211 of the post from, for example, "Just Me" such that the posting is only accessible the uploading user, "Public" such that the posting is accessible to everyone, or to all guest users and/or registered users of the application server 103 above, or "Group" which includes an affinity group to which the user belongs to, such as a circle of colleagues, friends, and/or those other users who follow and/or are followed by the user. Posting location 212 comprises a digital identifier to which the posting or user-generated content is associated with, such that when other users access the same URL or a web document having the same digital identifier, the posting may be visible to that user, depending the privacy setting 211.

Specifically, the digital identifier may comprise a Uniform Resource Identifier (URI), Uniform Resource Locator (URL), Digital Object Identifier (DOI), as well as any combination of content, such as keywords, metadata, or any combination of alphanumeric or Unicode characters, that may be used to distinctively identify a web document a user is presently viewing. For example, when viewing an e-book whether as a PDF, EPUB, HTML, AZW, XPS, IBOOK, or other formats, and whether embedded within a browser webpage or otherwise, the International Standard Book Number (ISBM) associated with the book may be used as the digital identifier. This allows all users viewing the same book to communicate with each other, regardless of the format the book is saved in, or the location where the book is saved at.

The viewing section 220 comprises viewable content from all users that are viewable to the user, in accordance to the permission or privacy setting of each piece of content or posting. For further clarification, all other users having content or postings having a "Public" privacy setting or a "Group" privacy setting to which the user is a member of, will be viewable to the viewing user. The viewing user may further filter the viewable content through a filter selection 221. For example, the viewing user may filter all viewable content in order to view only content by the user's "Friends", by a certain "Group", or only postings of the viewing user under "My Posts". Respective viewable content or further filtered content will be displayed to the viewing user, forming a portion of viewing section 220. In at least one embodiment, the viewing user may be able to comment or reply, as in 223, to other user postings. These replies may thus inherit the privacy setting 211 of the parent content. These replies may also be customized with their own privacy settings.

The chat section 230 may further provide live chat functionality in some embodiments of the present invention. For example, the viewing user may be able to visualize how many other users are viewing the current content, at 231, and/or the user may visualize how many other users are in a chatroom associated with the current digital identifier or URL of a web document. The chatrooms, or synchronous conference rooms, allow users of the present invention to communicate with each other in real time. Each chatroom would be associated with a particular digital identifier or URL, such that users viewing the same content may communicate to other users viewing the same content on the Internet, in real time or near real time. Content communicated by the users may be transient, i.e. not stored on the application server 103, in some embodiments. In other embodiments, a log of user content communicated through the chat rooms may be kept, such that the user may access them at a later time. The chatroom and live chat feature may be supported by existing protocols such as Internet Relay Chat (IRC), other known protocols or services, or a proprietary chat system hosted on the application server 103.

Figure 3:
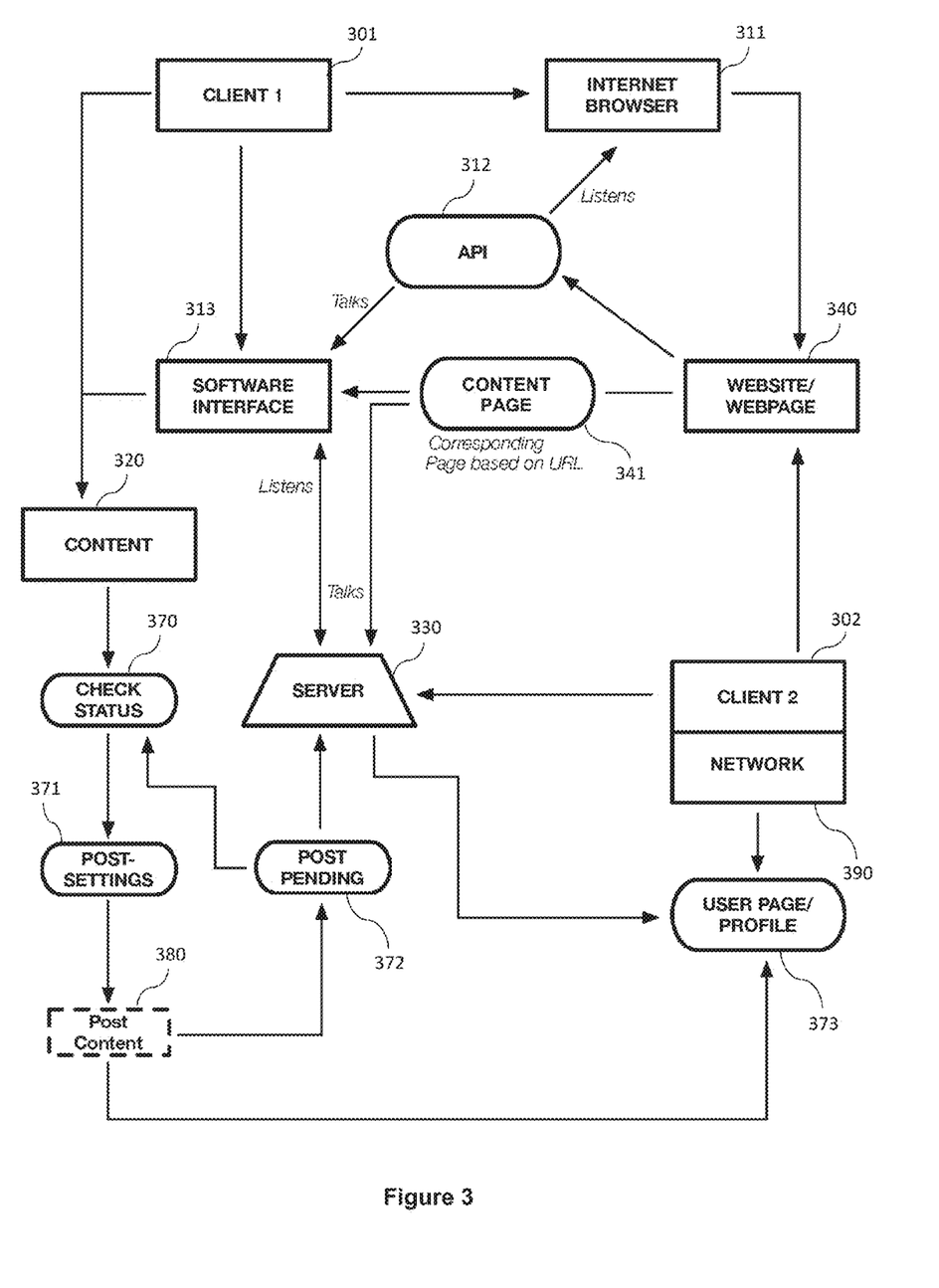
FIG. 3 illustrates an exemplary data flow diagram directed to a method for web document specific messaging.

For additional clarification, FIG. 3 further illustrates a data flow diagram directed to at least one additional embodiment of the present for web document specific messaging. Accordingly, a user or client 301 through the use of an electronic devices, such as those described above, launches a software interface 313. The software interface 313 may be launched directly by the user such as pressing on an icon, or may be prompted to open upon a trigger event such as navigating to a website or a specific website. The software interface 313 may comprise a web application, or a stand-alone application, depending on the particular device used and the accessibility of the client 301.

While the client 301 surfs the Internet through an internet browser 311, such as those described above, an application programmable interface (API) 312 may be programmed and configured to detect and relay data from the internet browser 311 to the software interface 313. For example, the current website or webpage 340, and current Uniform Resource Locator (URL) the current client 301 is viewing may be relayed by the API 312. If the client 301 changes to a different website or network 102, the API 312 will accordingly relay that change to the software interface 313 in order to query and display relevant content.

As discussed above, URLs or other digital identifiers may indicate an online document or site. By using a downloaded or preinstalled API 312, the present invention has the ability to identify the URL or digital identifier the client 301 is currently viewing or has otherwise selected, and relay the digital identifier to the software interface 313 and application server 330. On the application server 330, the digital identifier is then used as a filter or query to retrieve and display relevant content 320 created by both the client 301 and by other users of the network 390, such as a second client 302.

The API 312 may relay the digital identifier of a currently viewed website or web document to the software interface 313 in various ways, which may comprise automatic detection through the use of algorithms and computer code, or the manual entry of a digital identifier such as a URL into the software interface 313 itself, or through graphical activation such as clicking an icon or scanning a QR code to prompt the function of the API 312. A few examples of the current URL detection algorithms are described herein.

For example, in PHP the current URL may be parsed out in discrete segments comprising $pr for protocol, $h for host, $s for script, and $pa for any parameters. These segments may then be combined into $url for a complete url:

$pr=strpos(strtolower($_SERVER['SERVER_PROTOCOL']),'https')===FALSE ? 'http':'https';
$h=$_SERVER['HTTP_HOST'];
$s=$_SERVER['SCRIPT_NAME'];
$pa=$_SERVER['QUERY_STRING'];
$url=$p . '://' . $h . $s . '?' . $p;
echo $url;

As another example, in Javascript the current URL of a browser window may be retrieved simply by one or more of the following functions:

window.location.host
window.location.hostname
window.location.origin

Of course, the retrieval of the digital identifier may be programmed or implemented in any other programmable or scripting language known to those skilled in the art, such as but not limited to C, C++, C#, Ruby, Java, Dart, Rust, Swift, Perl, and other equivalent languages and past, present and future variations. Other digital identifiers, in addition or as an alternative to the URL of a current web site or document, may also be used, such as URI, DOI, or other identifiers, as well as any content or metadata of the current web site or document. For instance, in at least one embodiment of the present invention, algorithms may employ search and parse functions in order to determine matches between a plurality of web sites or documents, which may hold the same or a similar information, but are hosted at different locations. In these embodiments, users may communicate with all other users viewing the same or similar document, regardless of the URL of the hosted document.

The content 320 submitted by a user and viewable by other users of the network 390 may be organized and displayed in the software interface 313, via a content page 341. The content page 341 may comprise content created by both the client 301 and the network 390, including user posts, media, and other items. Network 390 may comprise the application server 330 as well as additional functionality such as integrated login authentication and social media from other sources that the application server is in communication with. The content 320 that forms a portion of the content page 341 is stored on application server 330, which may comprise at least one database and hardware storage device.

The application server 330 is continuously updated with new content by the network 390 and relays the content to its respective content page 341, as to make the system dynamic, whereby new content is displayed without the need for refreshing or reloading. This dynamic implementation may comprise a push-notification system, whereby the application server 330 transmits to the software interface 313 an update upon receiving new content. Alternatively, the dynamic implementation may also be implemented via automatic querying performed by the software interface 313, such as auto-refreshing for updated content at predetermined intervals or upon predetermined actions.

Further, the content page 341 and software interface 313 may also allow users to perform a variety of tasks, namely, to communicate in real-time with other users viewing the same web document, including limiting communication to only other users they know, the ability to rate, categorize, or bookmark or favorite a web document for later retrieval.

Each user of the network 390 and application server 330 may be required to create an account with the application server 330, or to log in through an existing credential service that may be integrated with the application server 330 through known APIs provided by services such as a Google, Facebook, Twitter, Amazon, LinkedIn, or other login account(s). Each account is used to represent an individual, group, or organization associated with that account, and will house data including a user's login information, general identifiers such as name, profile picture, contact information, and a summary of the user's activity on the application server 330 and/or network 390. Various information may be visible to the user themselves, as well as other users of the network 390 or application server 330, depending on respective privacy settings set by a user. As the user posts content to various content pages 341, their activities are stored on the application server 330, and may be posted on their profile page. Items present on the user's profile page 373 may be altered and organized as an alternative to altering content directly on a content page 341, giving the user the ability to bookmark and categorize favorite websites they have visited or have posted on.

Content 320 posted to the applications server 330 may comprise any form of compatible digital media, including text, images, audio and video files, applets and plugins, executable software, and other digital files. Before content 320 is posted to a content page 341 or to a profile page 373 of a user via the software interface 313, both the client 301 and the content 320 may be algorithmically examined for compatibility and security. This examination includes checking the client's 301 status, ensuring proper authorization as a user registered to the application server 330 or network 390, connectivity to the Internet, and that the created content 320 is compatible with the requirements of the application server 330. This "Check Status" 370 functionality operates continuously and systematically as the client 301 uses the present invention, in order to safeguard the application server 330 and other users such as client 302. For example, antivirus and antispam integration may be utilized to flag or automatically disable certain content from being received and stored, or from being posted, whether based on content or source IP address matching. These implementations may be entirely proprietary to the application server 330, but may also be integrated from existing commercial solutions such as Akismet or CAPTCHA. In other embodiments, manual operators or administrators may be utilized to flag or disable unwanted content or security concerns.

The present invention also offers a variety of "Post Settings" 371 for users to make their content 320 more relevant and accessible to the network 390 and other users. Through these settings, users can filter who can view their posted content 320, whether it is a specified group of other users of the network 390, the entire network 390, or attribute the content 320 as viewable exclusively by the posting user or client 301, i.e. by making the posting or content 320 "private". Additional Post Settings 371 may comprise "tagging" content 320 with keywords or "hashtags", bookmarking, adding as a favorite, or categorizing the viewed website or webpage 340 for future reference, and the option to speak directly with another user or client 302 in a private chat or private messaging rather than publicly on a content page 341. Incentive or metagaming features may be utilized by the application server 330 and network 390, such as allowing a user to upgrade avatars, titles, or to accumulate points for posting relevant and/or popular content 320.

Once the client 301 has created their content 320 and selected the desired Post Settings 371, they can then post that content, as in 380, to the application server 330. The content 320 is examined by the application server 330's at the "Post Pending" 372 stage, whereby the application server 330's security or anti-spam algorithms are activated to review the content 320. Upon approval in this step, the content 320 is added to the application server 330.

Figure 4:
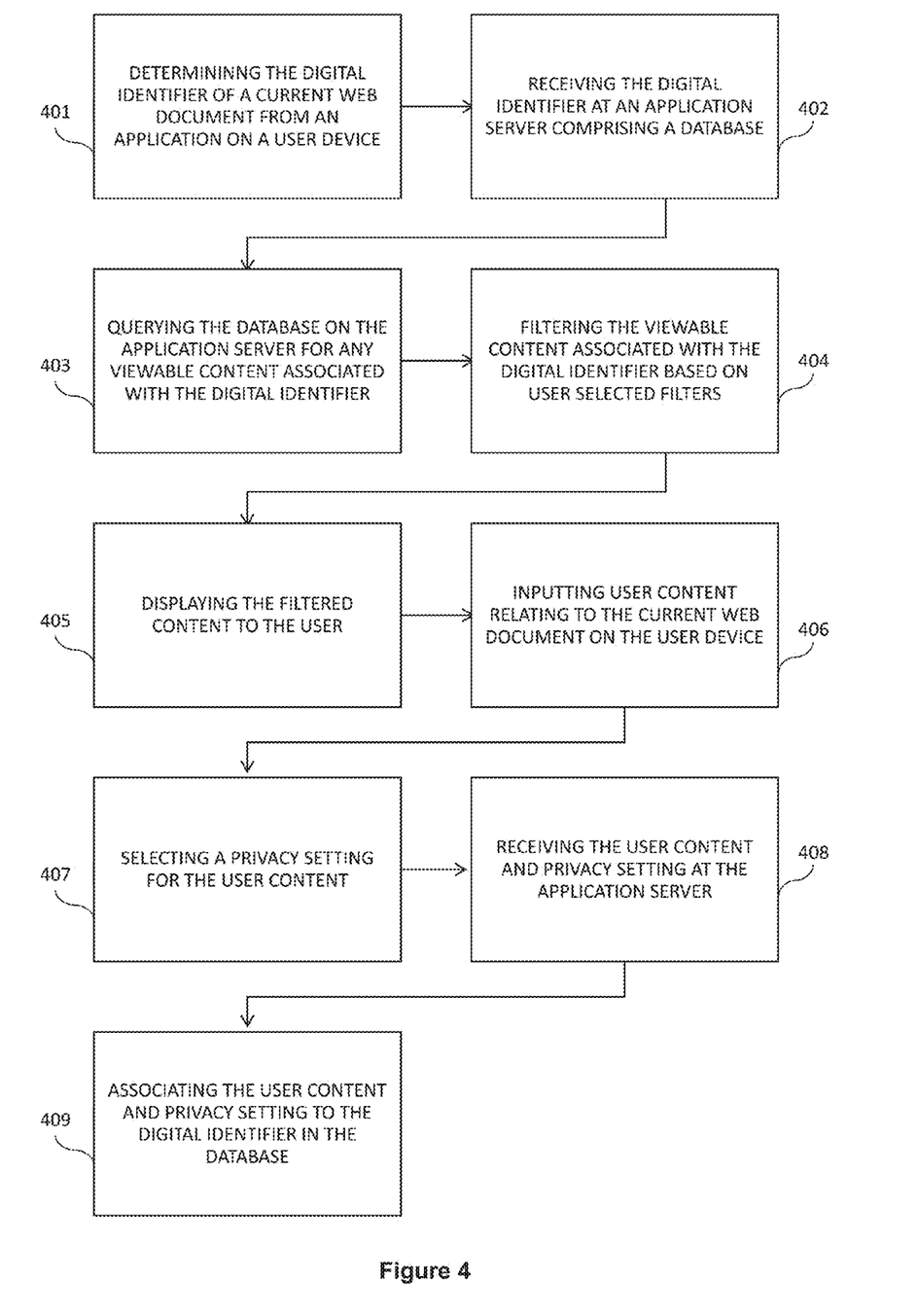
FIG. 4 is a flow chart directed to one embodiment of a method for web document specific messaging based on a digital identifier.

FIG. 4 is a flow chart directed to a preferred method of the present invention. Accordingly, the digital identifier of a current web document is first identified, as in 401, from an application on a user device. As described above, the digital identifier may comprise the URL, URI, DOI, or any content or metadata forming part of the web document being viewed. The web document may comprise a web page, a website, or any number of electronic documents viewable within an Internet application or web browser, including but not limited to PDF, HTML, XHTML, ASP, ASPX, PHP, SHTML, STM, PL, CGI, and other viewable web formats known to the skilled in the art.

Next, the digital identifier is received at an application server comprising a database, as in 402. The application server may comprise any combination of circuits and/or hardware components structured and configured to communicate data to and from the user device, as well as to store relevant respective data. The database may be installed on the application server, or may be installed on a remote location and in communication with the application server. The database may comprise a general purpose database management system (DBMS) such as MySQL, MariaDB, SQLite, Microsoft SQL Server, Oracle, SAP HANA, dBase, or databases known to those skilled in the art.

The database on the application server is then queried, as in 403, for any viewable content associated with the digital identifier. Viewable content includes any content and/or user-generated content submitted by other users, associated with the current web document the user is viewing, and for which the current user is authorized to view. For instance, content having a "Public" privacy setting are viewable to all users of the application server, content having a "Group" privacy setting are viewable to all users of a particular group on the application server, and a "Just Me" privacy setting results in the content being viewable only to the originating or posting user.

The viewable content may be further filtered, based on any user selected filters, as in 404. For instance, the user may be able to further filter the viewable content by selecting to view only various affinity groups to which the user belongs to, such as a circle of colleagues, friends, and/or those other users who follow and/or are followed by the user. The user may additionally be able to filter content by time, date, most recent, type such as only those with images, sound, video, or only those with attachments, ratings, the most popular or the least popular postings and/or users. Automatic filters may further be employed, based on algorithms on the application server which may be utilized to help determine the type of content a user wishes to view, based on a user's past activities and/or the user's preset preferences. The filtered content is then displayed to the user, as in 405.

The user may additionally input user content relating to the current web document on the user device, as in 406. User content may include text, links, video, images, and electronic file attachments. The user may be able to determine where to post the user content, such as what URL or other digital identifier the user content is to be associated with. The user may input additional metadata regarding the user content, such as hashtags, descriptions, keywords, and/or tag other users so that the other users are aware of this user content posting. The user content may be submitted in the form as an original or parent post, or as a comment or reply to another user's post or user content.

The user may additionally select a privacy setting for the user content, as in 407, such as "Public", "Group", "Just Me" as described above. In some embodiments, the privacy setting of a reply or comment post to another user's post will inherit that post's privacy setting. In other embodiments, users may also be able to set privacy settings to reply or comment posts. The user content and privacy setting are received at the application server, as in 408. Finally, the user content and privacy setting are associated with the digital identifier in the database, as in 409.

Figure 5:
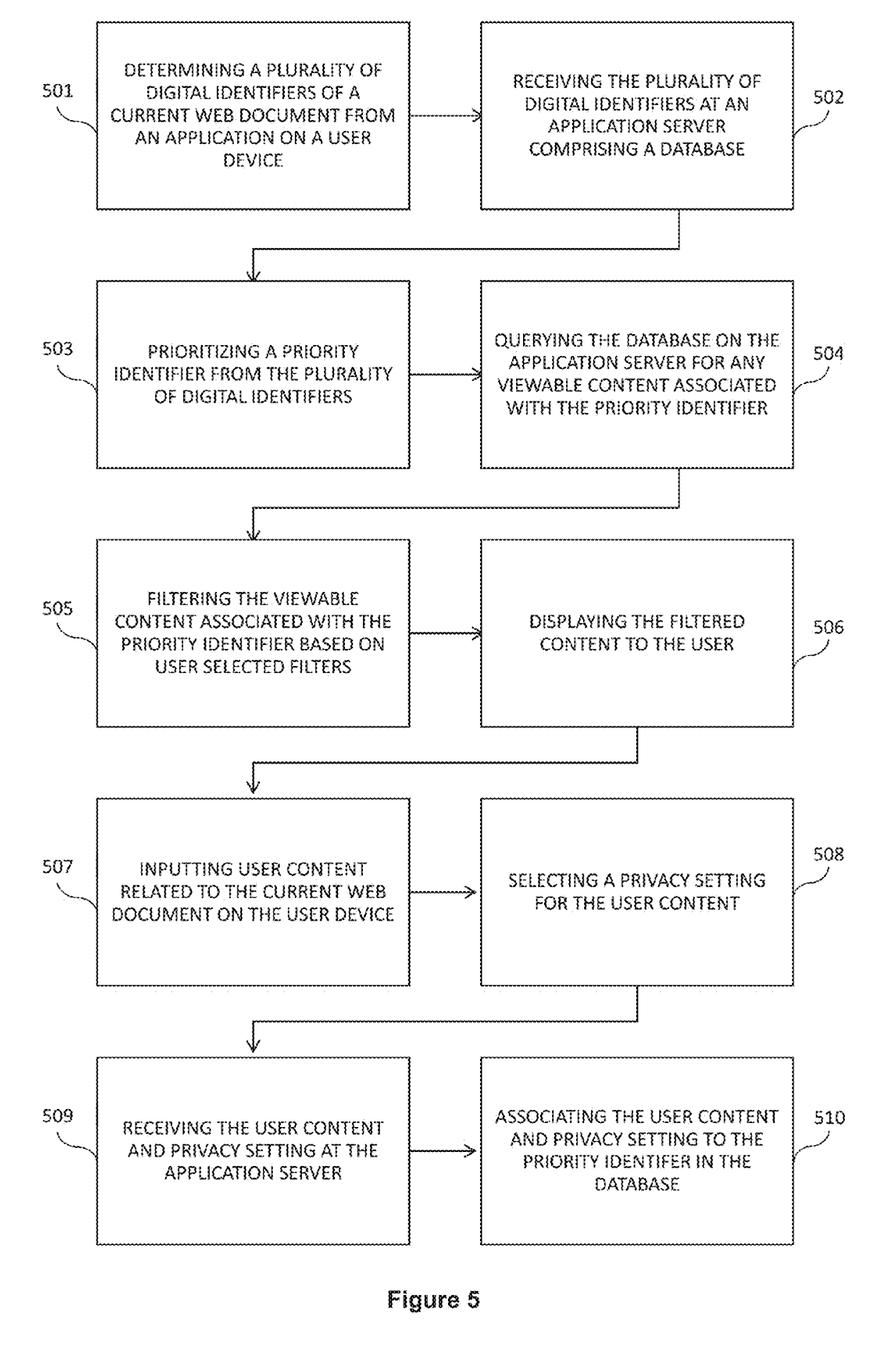
FIG. 5 is a flow chart directed to another embodiment of a method for web document specific messaging based on prioritizing a plurality of digital identifiers.

FIG. 5 is a flow chart directed to another preferred embodiment of the present invention. Accordingly, a plurality of digital identifiers for a web document is determined from an application on a user device, as in 501. Next, the plurality of digital identifiers are received at the application server comprising a data base, as in 502.

The application server prioritizes a priority identifier from the plurality of digital identifiers, as in 503. The prioritization step may be performed by algorithms within the application server, but may also be preselected manually by a user. For example, in situations where the same web document is displayed across a plurality of different mirror URLs, it may be useful to use a separate identifier, such that users viewing the same content at different locations may nonetheless communicate with each other. For example, when viewing an eBook, the ISBN of the book may be identified as the priority identifier. As another example, when viewing a court document, the court docket number and/or in conjunction with the court name and jurisdiction may be utilized separately or together as the priority identifier. Accordingly, in at least one embodiment, a URN may be prioritized over a URL. Specifically, a URN may comprise ISBNs, ISBNs, ISSNs, IETFs and RFCs, OIDs, UUIDs, NBNs; however, these identifiers may not necessarily be in the format of the URN namespace. Similarly, a DOI may be prioritized over a URL. A DOI may comprise a character string used to uniquely identify any electronic document.

After the priority identifier is identified, the database is then queried on the application server for any viewable content associated with the priority identifier, as in 504. The viewable content associated with the priority identifier may additionally be filtered with based on user selected filters, as in 505. These filtered content are then displayed to the user, as in 506. Additionally, user content may be inputted by a user, which may relate to the current web document being viewed on the user device, as in 507. A privacy setting may be selected for this user content to be submitted, as in 508. The application server will then receive the user content and privacy setting at the application server, as in 509. The user content and privacy setting is then associated with the priority identifier in the database, as in 510. In yet other method embodiments not shown, a user may further be able to initiate a chat session associated with the digital identifier on an application server. User input within the chat session may then be communicated between the user and another user of the application server.

Figure 6:
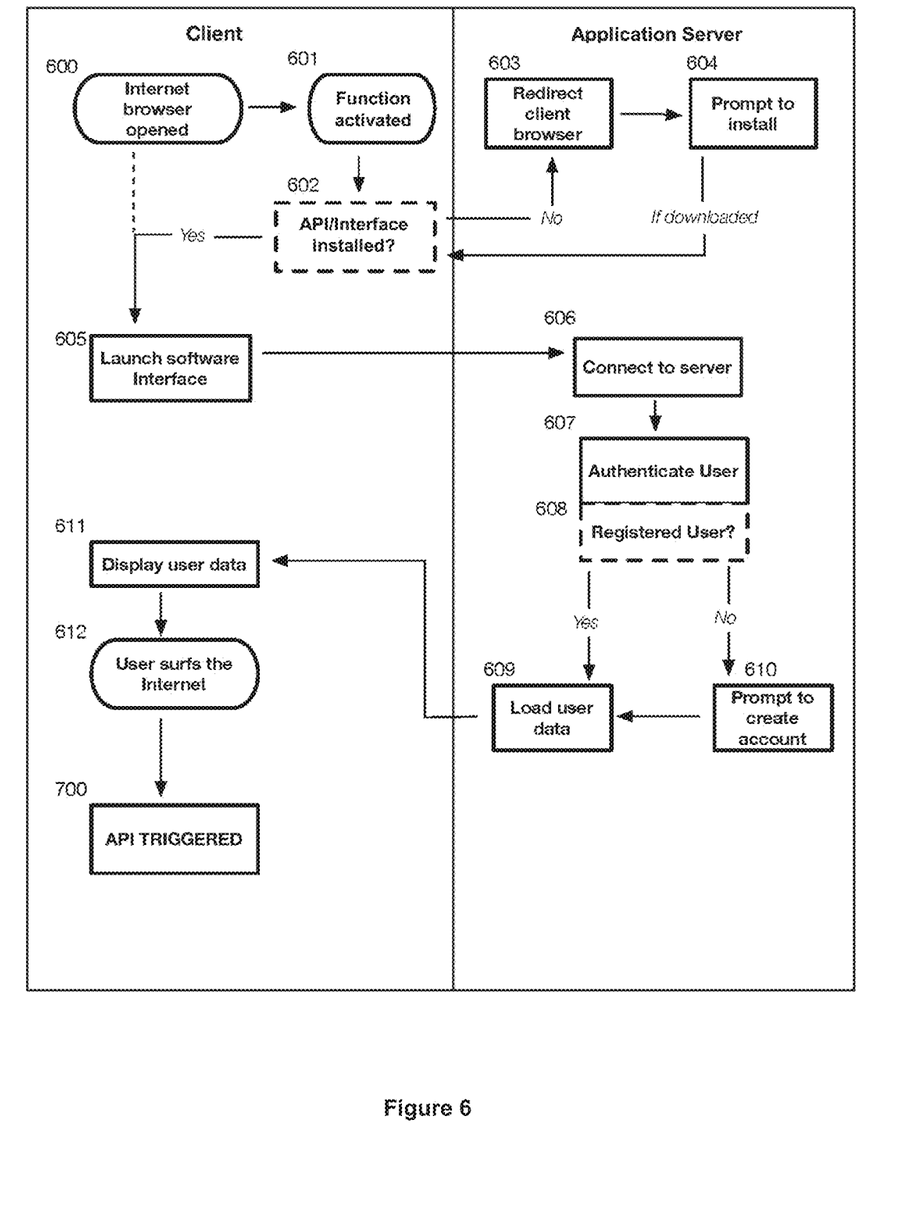
FIG. 6 illustrates an exemplary data flow diagram directed to the initial activation of a method for web document specific messaging.
Figure 7:
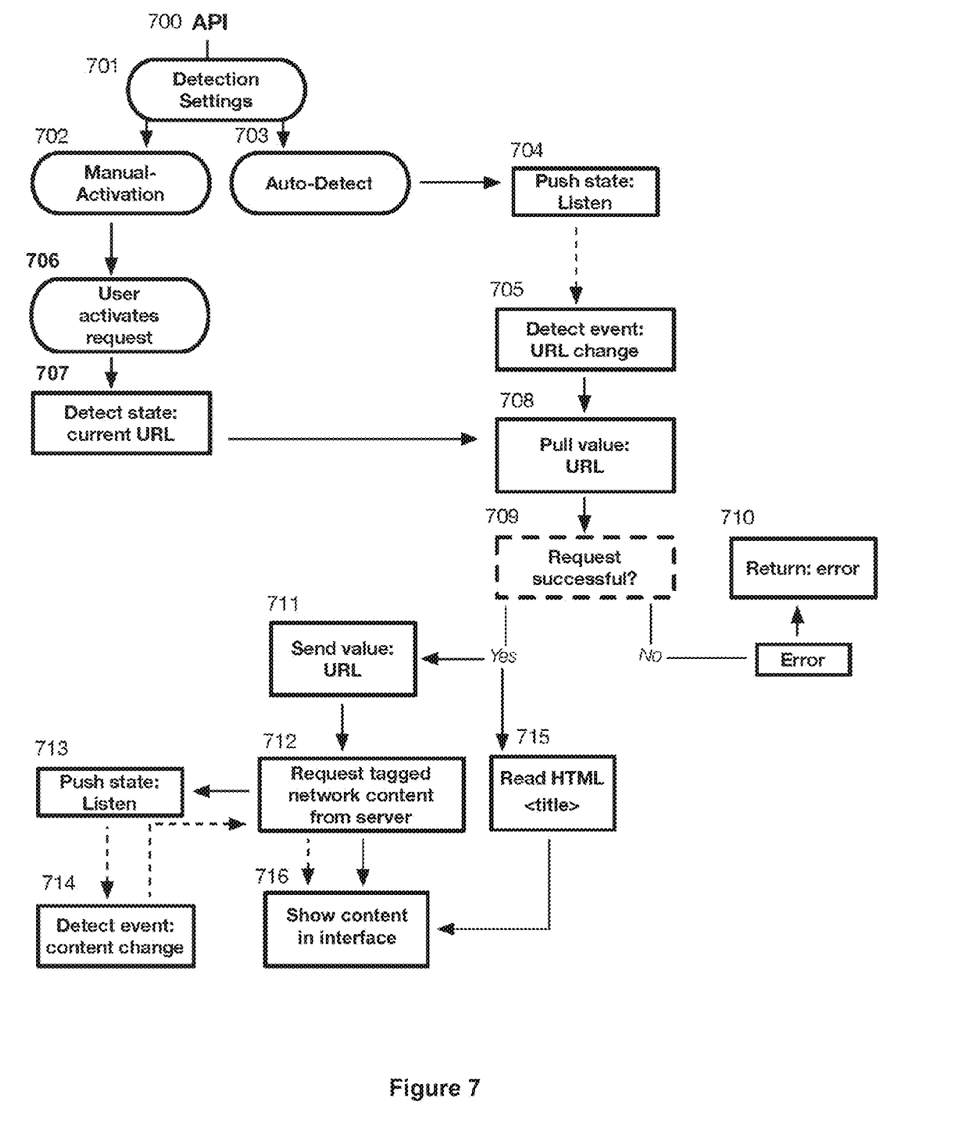
FIG. 7 illustrates an exemplary data flow diagram directed to an application programmable interface (API) interaction respective to a method for web document specific messaging.
Figure 8:
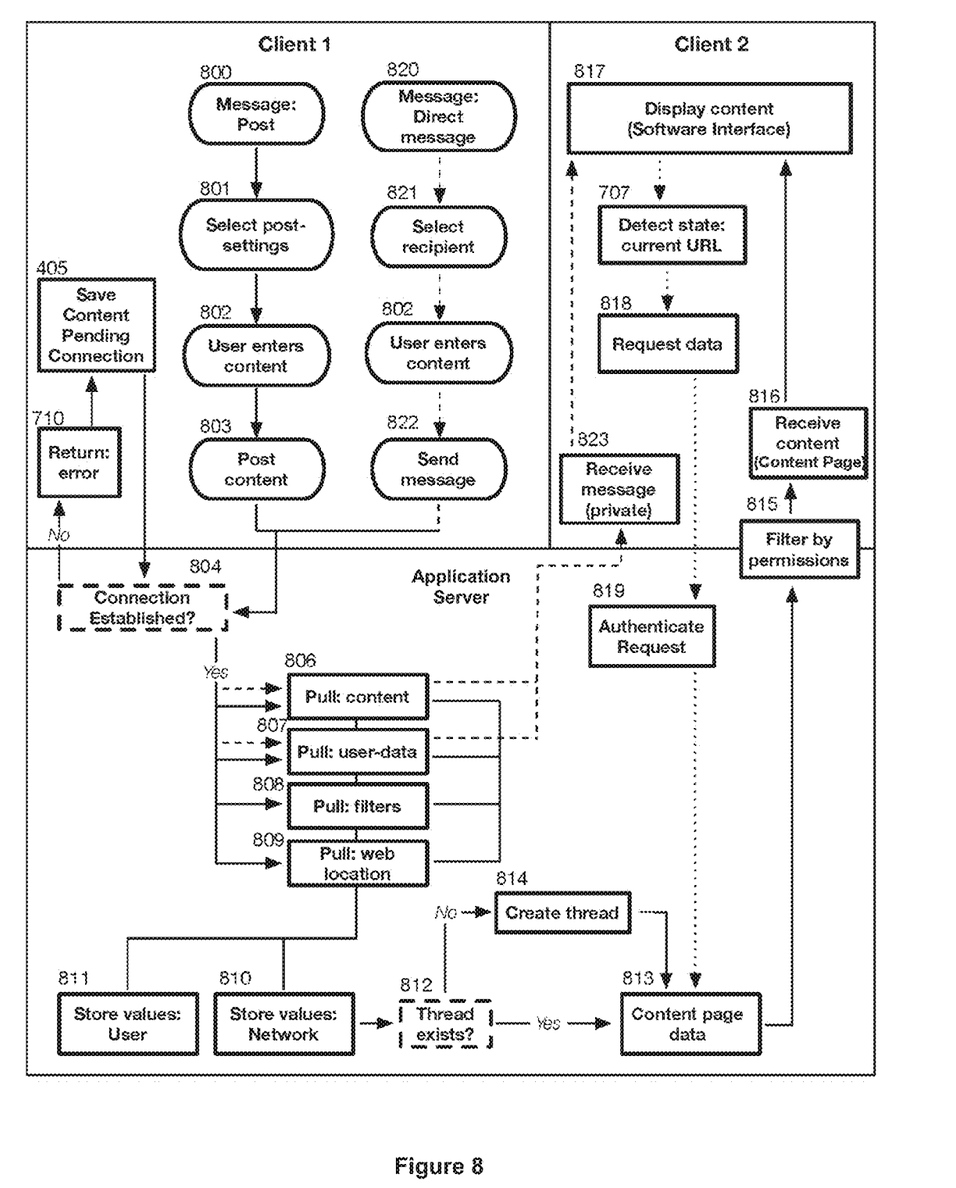
FIG. 8 illustrates an exemplary data flow diagram directed to the user interaction respective to a method for web document specific messaging.

For additional clarification, more detailed exemplary data flow diagrams are further provided in FIGS. 6-8 directed to a software, whether an add on or an independent application, interfaced with an Internet browser via an API. These subsequent flow diagrams may share terms and steps of the methods described above, particularly those of FIG. 3.

Accordingly, drawing attention to FIG. 6, in order to activate the present invention, a client via an electronic device may launch an Internet or web browser 600 as well as a software interface 605 installed on their device for performing the functionality of the present invention. The software interface 605 may either be manually executed, or may launch via a prompt through an activating function 601 via a webpage icon, link, or similar element. If the API and/or software interface is not installed on the client's device, as in 602, the client's browser may be redirected, as in 603, to either the present invention's website for download, or a corresponding application store entry, depending on the device being used, and be prompted to install, as in 604, the items needed to run the present invention. Once the software interface and API are installed, the software interface 605 will launch on the client's device, and will attempt to connect to the application server, as in 606. The application server will authenticate the user or client's account, as in 607, as they attempt to login. If they are a registered user in 608, the server loads that user's data 609 onto the client device in 611. Otherwise, the user may be prompted to create a new account as in 610. As the user surfs the Internet as in 612, the API of the present invention may be manually or automatically triggered to carry out the functionality described herein.

Next, drawing attention to FIG. 7, the API 700 may be downloaded by the client onto their device to be used in connection with a software interface thereon, such as a web browser. The API 700 will request authorization either upon download or agreement of predetermined terms and conditions, by the user, in order for the API 700 to access the web browser's basic functionality. Based on the client's settings or authorization 701, the API 700 will carry out its functions either through a series of auto detection 703 algorithms, or through manual activation 702. The API 700 may be set to auto-detect by default, unless the client otherwise alters the settings. Both the manual activation 702 and auto detect 703 functions result in the detection of the current active URL or digital identifier associated with a web document the client is viewing 707. The API 700 achieves this goal by accessing pre-established functions built in to all Internet browsers, i.e. accessing web servers via URLs (707), and monitoring actions that change the current URL (705).

The auto-detect process (703) actively listens (704) and monitors the client's web browser specifically and exclusively for a change in URL (705), in which a web browser registers that the client has entered or selected a new URL, and has activated that link. It then pulls the URL (708) and associated data such as the site favicon and title (715) and displays those values on the software interface (716), as well as sends the URL value to the application server (711).

The manual activation (702) process performs the same task, however only detects the client's current URL (707) as opposed to monitoring a change. Manual activation can be triggered via an icon found a website, a button on the software Interface, or by simply copying and pasting or typing the URL into the software interface. The manual method would bypass the detection algorithms (707) and send the values directly to the application server (711). In the event that the detection or listening functions are unsuccessful (709), an error will appear (710) on the client's software interface to help troubleshoot the issue.

After the URL value has been sent to the application server (711), the client will request from the application server any content associated with that corresponding URL (712) found in the application server content database. The retrieved content is organized and displayed in a thread referred to as a content page as shown in FIG. 3 as 341. When a client receives a content page, the client opens a connection with the server, and specifically the content page thread, and actively listens (713) for any alteration or addition of content (714) by the application server or network on that specific page, making each content page an interactive forum for clients viewing the same webpage.

In at least one embodiment, it should be noted that in the event that multiple webpages share the same URL (such as is common with some web applications), the API will not be able to differentiate between these webpages, and the associated content page will remain the same as the user navigates throughout that particular website (i.e. The API can only detect changes between static webpages and their URLs, not dynamic changes that occur on a webpage that do not involve a changing URL). In such a situation, it may be desirable to update and adapt the API to read more unique identifiers found in a webpage's HTML/CSS code (such as a specifically labeled 'href' or title), or other digital identifiers as described above. This may require the owner of that webpage or web application to intentionally add code or tags that the API could monitor as it changes, as labeling may change from website to website.

In the event that the website's owner alters or removes a URL, the API and application server will not be able to track this change, and the content page thread associated with that URL would be undesignated to any specific webpage. To reconnect an undesignated content page with a URL, an application server administrator may manually change the URL tag found in the content database to be associated/merged with an existing webpage, or disregard that content thread altogether. Alternatively or in addition to this, the administrator function may also be crowd sourced to a plurality of users, such as through a reporting mechanism.

Drawing attention now to FIG. 8, in communicating with other clients via the present invention and application server implementing the methods thereof, a user may have at least two options: a direct message (820), or a content page post (800).

The direct messaging feature of the present invention may act as a standard messaging application would. To message another user directly, the client must select the recipient of the message (821) on the software interface, create the content they wish to send (802), and send the message to the application server (822). If there is an established connection to the application server (804), the user data (807) and content (806) are transmitted to, and received by the server, and directly sent to the intended recipient. When the message is received (823), it will be displayed on the recipient's software interface whenever they are online and connected to the application server (817). If a connection cannot be established, an error message will appear (710) asking the client to check their Internet connection, and the content is saved until said connection is established (805). The send values (806 & 807) are stored on the application server as user-data (811).

A user may also be able to direct messages to the content page posting (800) functionality. When viewing a web page in the client's web browser, and its corresponding content page is visible on the software interface, the client can post a message onto the tread associated with that URL. A thread may comprise an organized text entry or a data entry into an existing database in accordance with known database schemas for storing information associated with message boards or forums. The client can select the post setting (801) for their message via the interface, which includes which users who can view their post, and what tags they wish to add to the post. The user then enters their content (802), which can be in the form of text, images, audio or video files, or any other form of compatible media. Once these two functions are complete, the client can post their content to the respective content page (803).

As for the direct-messaging feature, a connection must be established with the application server (804) for post-content (800) to upload in order to be viewed. Once a connection is established, the user content (806), user data (807), filters and settings (808), and their current URL/content page opened (809) are stored in the server database (810). The server then examines to see if a thread/content page exists (812) for that particular URL (809). If a thread exists, that content (806), user-data (807), and filters (808) are added to that content page (813). If not, a new thread is created with that data (814).

All posted-content (800) is filtered before being sent to a client's device (815). If they are authorized to view that content (such as if a post is a public post), that client can receive that data on its respective content page (816), which will be visible on their software interface (817). Content is visible on the client's software interface based on the current URL (707) that client is viewing, with the exception if they are viewing a content page directly (such as through manual entry of a URL) or content posted by a specific user visible on their profile page (373). A client's interface will request data from the server (818) based on their current URL (707), which will be authenticated by the server (819) to ensure the request for this data is secure and from a registered user. Posted messages (800) can also be seen on a user's profile page (373) depending on the post settings or permissions (801) set by the user pertaining to any particular post. This data is pulled from the application server database as items posted by that registered user (811).

Figures 9A, 9B, 9C, 9D:
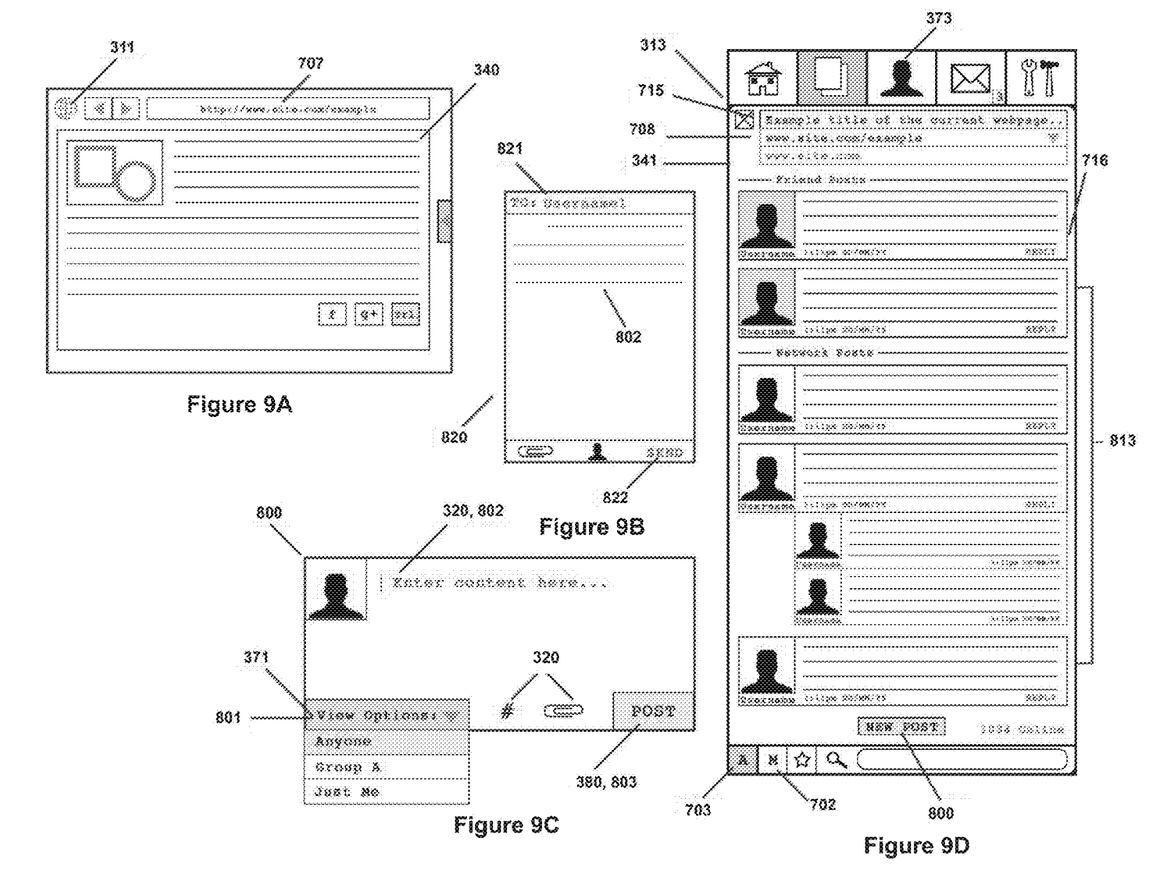
FIG. 9A illustrates a partial view of another wireframe directed to a user interface of an application for performing a method for web document specific messaging.
FIG. 9B illustrates a partial view of another wireframe directed to a user interface of an application for performing a method for web document specific messaging.
FIG. 9C illustrates a partial view of another wireframe directed to a user interface of an application for performing a method for web document specific messaging.
FIG. 9D illustrates a partial view of another wireframe directed to a user interface of an application for performing a method for web document specific messaging.

FIG. 9 illustrates another exemplary wireframe directed to a software interface for the present invention. The reference numerals are keyed to the exemplary data flow diagrams of FIGS. 3, 6-8, in order to better illustrate the above described functionality from a user view.

Any of the above methods may be completed in sequential order in at least one embodiment, though they may be completed in any other order. In at least one embodiment, the above methods may be exclusively performed, but in other embodiments, one or more steps of the methods as described may be skipped.

It should also be understood that the above methods may exist as other embodiments when not in operation. Specifically, a computer program may exist on a non-transitory storage medium such as a hard disk, flash drive, nonvolatile memory, or other storage device, which captures the operational processes and characteristics described above, and which may be executed by a computer or other device to perform the method described above. The computer program may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations.

Further, a physical system may also be designed by employing existing components and hardware known to those of ordinary skill in the art, such as to effect the operation of the method described above in a general purpose computer, a specialized computer or machine, as a software on chip, or as part of other integrated circuits or combination of circuitry and components.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method for web document specific messaging comprising:
   determining a plurality of digital identifiers of a current web document from an application on a user device,
   receiving the plurality of digital identifiers at an application server comprising a database,
   prioritizing a priority identifier from the plurality of digital identifiers,
   querying the database on the application server for any viewable content associated with the priority identifier,
   filtering the viewable content associated with the priority identifier based on user selected filters,
   displaying the filtered content to the user.

2. The method of claim 1 further comprising:
   inputting user content relating to the current web document on the user device,
   selecting a privacy setting for the user content,
   receiving the user content and privacy setting at the application server,
   associating the user content and privacy setting to the priority identifier in the database.

3. The method of claim 1 wherein the plurality of digital identifiers comprise URL, URN, DOI, and content of the current web document.

4. The method of claim 3 further comprising prioritizing a URN over a URL, such that when the plurality of digital identifiers comprise a URL and a URN, the URN will be used as the priority identifier.

5. The method of claim 3 further comprising prioritizing a DOI over a URL, such that when the plurality of digital identifiers comprise a URL and a DOI, the DOI will be used as the priority identifier.

6. The method of claim 3 further comprising prioritizing content over a URL, such that when the plurality of digital identifiers comprise a URL and the content of a web document, the content will be used as the priority identifier.

* * * * *